United States Patent Office 3,356,623
Patented Dec. 5, 1967

3,356,623
PROCESS FOR USING HUMIC ACIDS AND LIGNIN IN VULCANIZABLE RUBBER
Nelson N. Schwartz, Lawrence Township, Mercer County, N.J., assignor to FMC Corporation, New York, N.Y., a corporation of Delaware
No Drawing. Filed Mar. 16, 1964, Ser. No. 352,334
8 Claims. (Cl. 260—17.4)

ABSTRACT OF THE DISCLOSURE

A completely formulated, vulcanizable rubber stock is produced by dispersing desired fillers, modifiers and curing agents along with an effective amount of either a water-soluble humate or a water-soluble lignin salt as a dispersing agent in a latex of rubber, precipitating the dispersing agent in situ by adding a water-soluble zinc compound in an amount equivalent to at least 5 parts of zinc per 100 parts of rubber and an acid which does not form an insoluble salt with said zinc compound in amounts sufficient to neutralize said dispersion, and recovering a completely formulated, vulcanizable rubber stock.

---

This invention relates to vulcanizable rubber stocks which are reinforced with humic acids, salts of humic acids, lignin, and salts of lignin, and more particularly, to a method for producing these reinforced, vulcanizable stocks by masterbatching.

The term "lignin" is used in this application to describe the non-carbohydrate, water-insoluble material obtained by extracting wood with a water solution of either a metal hydroxide, a sulfite, a sulfide, or mixtures thereof, and neutralizing the extract.

The term "humic acid" is applied to acidic solids obtained from plant decomposition. Humic acids can be recovered by extraction of leonardite (a naturally occurring weathered lignite) with an aqueous sodium hydroxide solution; the acid is precipitated upon neutralization of the solution. Humic acids are regarded as the intermediate products which result from the conversion of lignin and other plant materials to hard coal.

Many synthetic rubbers are prepared by aqueous emulsion polymerization. For example, GR–S rubber (also called SBR), is prepared by emulsion polymerization of 1,3-butadiene and styrene. In practice, the monomers are emulsified in water with an anionic surface active agent and the emulsion is polymerized in the presence of conventional catalysts. The preferred anionic surfactants used as emulsifiers are water-soluble salts of soap-forming monocarboxylic acids, such as the alkali metal salts of higher fatty acids, rosin acids, or naphthenic acids. After the desired polymerization has occurred, the reaction is stopped, residual unreacted monomers are removed, and the resultant latex is flocculated by the addition of conventional coagulating agents, e.g. aqueous solutions of acids and brine.

The resulting coagulated latex is dried and is intimately mixed with additives such as reinforcing agents, curing agents, etc. by conventional dry-milling techniques. In certain instances, the SBR latex mixture may be mixed with reinforcing agents before coagulation. In this technique, the reinforcing agents are mixed with the latex so that both the polymer and the reinforcing agent are coagulated together by the added coagulating agent, e.g. acid. This simultaneous coagulation of the polymer and additives is termed "latex masterbatching."

It is known that humic acids and polyvalent metal humates are useful as rubber reinforcing agents, particularly in synthetic rubbers. In U.S. Patent No. 3,075,931, issued to William L. Davidson et al. on Jan. 29, 1963, there is taught a method for using the partial salts of humic acids as reinforcing agents in vulcanizable synthetic rubbers. In this patent, the partial salts of polyvalent humates are added as reinforcing agents either by milling these agents into the coagulated, dried, synthetic rubber, or by latex masterbatching of the humates. In either case, the curing agents and modifiers must be added to the rubber by dry mixing these ingredients with the stock in a conventional rubber mill or mixer.

It would be desirable to add the curing agents, fillers, reinforcing agents and other additives to the latex emulsion by a complete masterbatching technique, in order to avoid the necessity of compounding these ingredients with dry, coagulated rubber by dry-milling or Banbury mixing. The intimate mixing of finely-divided additives into a solid mass of rubber requires expensive rubber-milling equipment, a skilled operator, and considerable time and power.

Complete masterbatching of the latex to obtain a satisfactory rubber has been found most difficult. This is due, in part, to the increased quantities of the dispersing agent, e.g. the water-soluble soaps, that must be used to keep the added ingredients in a fine dispersion in the latex. The increased amounts of dispersing agent (the water-soluble soaps of soap-forming monocarboxylic acids), are all converted to the corresponding carboxylic acid upon addition of the acid coagulating agent to the latex. This increased amount of carboxylic acid in the latex deleteriously effects the properties of the resultant rubber. As a result, it is customary only to add the reinforcing agent by the masterbatching technique; curing agents, antioxidants, antiozonants, softeners, pigments, etc. are added subsequently by dry-mixing, e.g. milling or Banbury mixing.

It is an object of the present invention to produce a completely formulated rubber by a masterbatching technique in which the reinforcing agent, the curing agent, and other additives are added to a latex emulsion of the rubber to produce a completely compounded, vulcanizable, rubber without dry-milling additives into the rubber.

This and other objects will be apparent from the following disclosure.

I have now found that a completely formulated vulcanizable rubber having good properties can be produced in which the curing agents, fillers and modifiers are added to a conventional rubber latex in a masterbatch by adding an effective amount of either a water-soluble humate, or a water-soluble lignin salt as a dispersing agent, adding a water-soluble zinc compound in an amount equivalent to at least 5 parts of zinc oxide per 100 parts of rubber and an acid which does not form an insoluble salt with said zinc compound in amounts to neutralize said dispersion and precipitate either a zinc acid humate or a zinc salt of lignin in situ as the reinforcing agent.

The water-soluble humate or lignin salt acts as a powerful dispersing agent in the latex and maintains the nonsoluble constituents of the latex in a uniform, intimate mixture without the need for introducing any additional amounts of a soap dispersing agent. Upon precipitation of either the water-soluble humate as zinc acid humate or of the water-soluble lignin as a zinc salt in situ in the latex, it functions as a reinforcing agent.

In carrying out the present invention, the rubbers or elastomers used may be any of the natural or synthetic rubbers commonly used for tire manufacture. Among the synthetic rubbers or elastomers which may be used, other than GR–S rubber, are polymers obtained by polymerization of 1,3-butadiene, or homologs or analogs thereof such as isoprene, piperylene, 2,3-dimethyl-1,3-butadiene, chloroprene; or copolymers of the above with other monomers such as styrene, isobutylene, diisobutylene, acrylonitrile, methyl methacrylate, methyl acrylate, methyl vinyl ether, methyl vinyl ketone, and other unsaturated esters, ethers and ketones. In practice, the synthetic rubber latex is made up by adding water and the surface active agent to a pressurized reaction vessel along with the monomers, e.g. butadiene and styrene. The monomers are then polymerized to the desired molecular weight to yield the synthetic rubber latex.

To the rubber latex thus obtained is added the water-soluble lignin or humates and the desired additives. This is done by making up an aqueous solution of one or more of the water-soluble humic acid salts, e.g. the sodium, potassium or ammonium salts of humic acid or water-soluble lignin salts, dispersing the curing agents, softeners, modifiers, etc. therein and adding the mixture to the latex. Sodium humate is the preferred reactant when humic acid is used because humic acid normally is obtained by caustic extraction of leonardite, a naturally occurring oxidized lignite, and results in a sodium humate solution. The humic acid can be used in amounts of from about 10 to 300 parts per 100 parts of rubber. Normally, the preferred amount is about 50 parts of humic acid to 100 parts of rubber.

In the case of the lignin salts, the sodium salt is preferred for reasons of convenience and economy. The lignin salt, e.g. sodium salt, is made up by dissolving lignin in an alkaline, e.g. sodium hydroxide, solution. The curing agents, softeners, modifiers, etc. are dispersed therein and the mixture added to the latex. The lignin is employed in amounts of from about 10 to 300 parts per 100 parts of rubber, with about 50 parts being preferred.

To the above latex mixture is then added a mixture of an acid and a water-soluble zinc compound. Typical of such compounds are zinc chloride, zinc sulfate, zinc formate and zinc acetate. Alternatively, zinc oxide may be added to the acid as hereinafter defined, in order to produce a water-soluble zinc compound in situ in the acid mixture. The zinc compound is added in amounts equivalent to at least about 5 parts of zinc oxide per 100 parts of rubber. This amount of zinc has been found to be necessary to obtain a properly cured rubber. Larger amounts of the zinc compound can be added, if desired. However, the zinc compound is generally added to obtain the best proportion of zinc to hydrogen ion which will permit the zinc humate-humic acid or zinc-lignin mixture to give optimum physical properties of reinforcement. This amount may range from 0.1 to about 0.8 equivalent of zinc per humic or lignin equivalent, that is, per total equivalent of either humic acid plus humate, or lignin plus lignin salts.

The acid used should be capable of neutralizing the latex and precipitating the humic acid or lignin but should not form an insoluble zinc salt or react with the additives or curatives in the latex. Typical of such acids are hydrochloric acid, sulfuric acid, formic acid and acetic acid. The acid is added in amounts sufficient to neutralize the latex dispersion, thereby precipitating the humate or lignin in situ. If zinc oxide is used to produce a water-soluble zinc compound in situ, the acid and zinc oxide are added as a solution. The zinc additives can be added in combination with any suitable acid. For example, zinc chloride can be admixed with hydrochloric acid or sulfuric acid, etc.; the zinc chloride also can be added initially followed by the addition of one or more of the acids. The precipitate resulting after addition of the acid is coagulated and removed by filtration, dried, molded and cured.

During the masterbatching process, the water-soluble humate or lignin acts as a dispersing agent to maintain the nonsoluble additives in the masterbatch in a suspended and uniform dispersion in the latex. After addition of the acid coagulating agent, the water-soluble humate is converted to zinc humate and humic acid in a ratio which depends upon the amount of zinc which is added to the masterbatch; similarly, the water-soluble lignin salt is converted to the insoluble zinc salt of lignin. The resultant mixture of the zinc salt and either humic acid or lignin then acts as a reinforcing agent in the coagulated rubber. The present rubber stocks that are produced by complete masterbatching have good physical properties compared with conventional stocks.

The following examples are given to illustrate the invention but are not deemed to be limiting thereof.

*Example 1*

To an aqueous solution of sodium humate containing the equivalent of 100 g. of humic acid and 0.57 mole of total base (as NaOH) was added 4 g. of sulfur, 4 g. of benzothiazyl disulfide, and 0.6 g. of Cumate (copper dimethyldithiocarbamate). This was prepared as a fine dispersion by passing the mixture several times through a colloid mill. The dispersion was then added to a mixture of 1200 g. of Type 1502 SBR latex (containing 16.7% solids and made up of a butadiene-styrene copolymer containing 22½% to 24½% by weight of bound styrene) and 6 g. of a 1% solution of Separan NP10 (a latex, coagulation aid of the polyacrylate type). To this mixture was added, with vigorous stirring, a solution of 16.8 g. of zinc chloride and 30 ml. of concentrated (12 N) hydrochloric acid in 200 ml. of water. The resultant precipitate was removed by filtration, dried under reduced pressure at 60° C., and sheeted out. Samples of the sheet were press-cured for various periods in a standard 6 inch square mold, 0.075 inch thick using 55 tons total force on the ram at 300° F. After curing, the rubber stock was tested in accordance with ASTM D-412-51T, ASTM D-624-54, and ASTM D-676-59T; the results obtained are reported in Table I.

TABLE I

| Cure Time, 300° F. (min.) | Physical Properties | | | | |
|---|---|---|---|---|---|
| | Tensile Strength (p.s.i.) | Modulus, 300% (p.s.i.) | Elongation (percent) | Tear Strength (p.s.i.) | Hardness (Shore A) |
| 25 | 623 | 613 | 380 | 220 | 69 |
| 50 | 1,052 | 1,007 | 387 | 284 | 75 |
| 100 | 1,987 | 1,341 | 554 | 309 | 80 |
| 200 | 2,573 | 1,572 | 510 | 299 | 82 |

*Example 2*

To a lignin solution containing the equivalent of 100 g. of Indulin AT, 10 g. of sodium hydroxide and 900 ml. of water was added 4 g. of sulfur, 4 g. of benzothiazyl disulfide, and 0.6 g. of copper dimethyldithiocarbamate. This was prepared as a fine dispersion by passing the mixture through an Eppenbach homomixer.

Indulin AT is a lignin derivative which is obtained by sodium sulfide extraction of southern wood, followed by treatment of the extract with a caustic solution and neutralization of the caustic. The resultant product is water-insoluble, but soluble in alkali, organic solvents such as amines, glycols, many heterocyclic solvents, and coal tar bases. A typical analysis of Indulin AT is moisture, 2–5%; ash, 0.5–1.0%, specific gravity, 1.3; pH, 2.5–3.5, methoxyl content, 13.9%; sulfur, 1.5%; sintering point, .410° F.

The dispersion was then added to a mixture of 1200 g. of Type 1502 SBR latex (containing 16.7% solids and made up of a butadiene-styrene copolymer containing 22½% to 24½% by weight of bound styrene) and the mixture stirred. To this mixture was added with vigorous stirring, a solution of 16.8 g. of zinc chloride and 25 ml. of concentrated 12 N hydrochloric acid in 100 ml. of water. The resultant precipitate was removed by filtration, washed with water, refiltered, dried under reduced pressure at 60° C. and sheeted out. Samples of the sheet were cured and tested in the manner reported in Example 1. The cure times, cure temperatures and the test results are reported in Table II.

TABLE II

| Cure Time, 300° F. (min.) | Physical Properties | | | | |
|---|---|---|---|---|---|
| | Tensile Strength (p.s.i.) | Modulus, 300% (p.s.i.) | Elongation (percent) | Tear Strength (p.s.i.) | Hardness (Shore A) |
| 12.5 | 1,268 | 1,178 | 340 | 307 | 76 |
| 25 | 1,805 | 1,326 | 416 | 328 | 80 |
| 50 | 1,981 | 1,470 | 402 | 365 | 82 |
| 100 | 2,489 | 1,751 | 397 | 335 | 84 |

*Example 3*

To a solution of sodium humate containing the equivalent of 100 g. of humic acid and 0.57 mole of total base (as NaOH) was added 4 g. of sulfur, 5 g. of mercaptobenzothiozole and 0.5 g. of dimethylthiuram disulfide. The mixture was passed through a colloid mill to obtain a fine dispersion. The dispersion was added to an amount of Plioflex Type 2108 latex (a butadiene-styrene copolymer containing 22½% to 24½% by weight of bound styrene) containing 200 g. total solids. To this mixture was added a solution of 16.8 g. of zinc chloride and 30 ml. of concentrated (12 N) hydrochloric acid in 200 ml. of water with vigorous stirring. The precipitate which formed was dried and cured as in Example 1. The physical properties of the cured product were of the same order as those determined in Example 1.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Process for producing a completely formulated, vulcanizable rubber stock comprising dispersing desired fillers, modifiers and curing agents along with an effective amount of a compound selected from the group consisting of a water-soluble humate and a water-soluble lignin salt as a dispersing agent in a latex of rubber, precipitating said dispersing agent in situ by adding a water-soluble zinc compound in an amount equivalent to at least 5 parts of zinc per 100 parts of rubber and an acid which does not form an insoluble salt with said zinc compound in amounts sufficient to neutralize said dispersion, and recovering a completely formulated, vulcanizable rubber product.

2. Process of claim 1 wherein said desired fillers, modifiers and curing agents are dispersed in an aqueous solution of said dispersing agent and the resulting dispersion is added to said latex of rubber.

3. Process of claim 1 in which said compound is a water-soluble humate.

4. Process of claim 1 in which said compound is a water-soluble lignin salt.

5. Process of claim 1 in which the humic acid is added in amounts of from about 10–300 parts per 100 parts of rubber.

6. Process of claim 1 in which the lignin is added in amounts of from about 10–300 parts per 100 parts of rubber.

7. Process of claim 1 in which the zinc compound is zinc chloride and the acid is hydrochloric acid.

8. Process of claim 1 in which the rubber latex is a butadiene-styrene copolymer.

No references cited.

WILLIAM H. SHORT, *Primary Examiner.*

J. NORRIS, *Assistant Examiner.*